US006608145B1

(12) United States Patent
Lin et al.

(10) Patent No.: US 6,608,145 B1
(45) Date of Patent: Aug. 19, 2003

(54) SILICA-REINFORCED RUBBER COMPOUNDED WITH AN ORGANOSILANE TETRASULFIDE SILICA COUPLING AGENT AT HIGH MIXING TEMPERATURE

(75) Inventors: Chenchy Jeffrey Lin, Hudson, OH (US); William L. Hergenrother, Akron, OH (US); Ashley S. Hilton, Massillon, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/687,437

(22) Filed: Oct. 13, 2000

(51) Int. Cl.[7] .................................................. C08F 8/34
(52) U.S. Cl. .................... 525/332.6; 524/442; 524/495; 524/262; 524/310; 524/317; 524/320; 524/392
(58) Field of Search ................... 525/332.6, 332.1, 525/333.1, 333.2; 524/492, 495, 111, 284, 377

(56) References Cited

U.S. PATENT DOCUMENTS

| | | | |
|---|---|---|---|
| 3,814,160 A | 6/1974 | Creasy ........................ 152/330 |
| 4,076,550 A | 2/1978 | Thurn et al. ............. 106/288 Q |
| 4,297,145 A | 10/1981 | Wolff et al. .............. 106/308 Q |
| 4,436,847 A | 3/1984 | Wagner ....................... 523/203 |
| 5,227,425 A | 7/1993 | Rauline ...................... 524/493 |
| 5,328,949 A | 7/1994 | Sandstrom et al. ......... 524/262 |
| 5,336,730 A | 8/1994 | Sandstrom et al. ...... 525/332.6 |
| 5,504,137 A | 4/1996 | Sandstrom et al. ......... 524/492 |
| 5,534,574 A | 7/1996 | Sandstrom et al. |
| 5,580,919 A | 12/1996 | Agostini et al. ............. 524/430 |
| 5,605,951 A | 2/1997 | Sandstrom et al. |
| 5,674,932 A | 10/1997 | Agostini et al. ............. 524/430 |
| 5,681,874 A | 10/1997 | Lucas et al. |
| 5,717,022 A | 2/1998 | Beckmann et al. ......... 524/493 |
| 5,780,537 A | * 7/1998 | Smith et al. ................ 524/493 |
| 5,780,538 A | 7/1998 | Cohen et al. ................ 524/494 |
| 5,804,636 A | 9/1998 | Nahmias et al. ............ 524/492 |
| 5,866,171 A | 2/1999 | Kata ............................. 425/46 |
| 5,872,171 A | 2/1999 | Detrano ....................... 524/492 |
| 5,872,176 A | 2/1999 | Hergenrother et al. ...... 524/494 |
| 5,876,527 A | 3/1999 | Tsuruta et al. ............... 152/541 |
| 5,914,364 A | 6/1999 | Cohen et al. ................ 524/494 |
| 5,916,951 A | 6/1999 | Nahmias et al. ............ 524/494 |
| 5,916,961 A | 6/1999 | Hergenrother et al. ...... 524/572 |
| 5,929,149 A | 7/1999 | Matsuo et al. .............. 524/262 |
| 5,931,211 A | 8/1999 | Tamura ................... 152/209.5 |
| 5,971,046 A | 10/1999 | Koch et al. .............. 152/152.1 |
| 6,008,295 A | * 12/1999 | Takeichi et al. ............. 525/105 |
| 6,022,922 A | 2/2000 | Bergh et al. ................ 524/492 |
| 6,022,923 A | 2/2000 | Araki et al. ................. 524/492 |
| 6,025,428 A | 2/2000 | Day ............................ 524/492 |
| 6,046,266 A | 4/2000 | Sandstrom .................. 524/492 |
| 6,053,226 A | 4/2000 | Agostini ................... 152/209.5 |
| 6,057,392 A | 5/2000 | Wideman et al. ........... 524/318 |
| 6,080,809 A | 6/2000 | Stuhldreher ................. 524/447 |
| 6,220,323 B1 | 4/2001 | Sandstrom et al. |
| 6,221,943 B1 | * 4/2001 | Hergenrother et al. ...... 524/265 |
| 6,228,908 B1 | * 5/2001 | Takeichi et al. ............... 524/27 |
| 6,242,516 B1 | * 6/2001 | Araki et al. ................. 524/267 |
| 6,313,210 B1 | * 11/2001 | Lin et al. .................... 524/492 |

FOREIGN PATENT DOCUMENTS

| | | | |
|---|---|---|---|
| CA | 2177095 | 11/1996 | |
| CA | 2242783 | 1/1999 | |
| CA | 2242801 | 1/1999 | |
| CA | 2243091 | 1/1999 | |
| EP | 0 641 824 | 3/1995 | |
| EP | 0 801 112 | 10/1997 | |
| EP | 0 824 131 | 2/1998 | |
| EP | 890 580 | * 1/1999 | ........... C08C/19/44 |
| EP | 0 890 603 | 1/1999 | |
| EP | 0 890 606 | 1/1999 | |
| EP | 0 926 192 | 6/1999 | |
| EP | 0 972 790 | 1/2000 | |
| EP | 0 972 799 | 1/2000 | |
| EP | 1 031 604 | 8/2000 | |
| EP | 1 061 097 | 12/2000 | |
| JP | 11 181161 | 7/1999 | |
| WO | WO 99/02601 | 1/1999 | |
| WO | WO 00/05300 | 1/2000 | |
| WO | WO 00/05301 | 1/2000 | |
| WO | WO 00/32684 | 6/2000 | |

OTHER PUBLICATIONS

Byers, John T. (1998) Silane coupling agents for enhanced silica performance. *Rubber World*, September, pp. 38–47.

Wolff, S. (1981) Reinforcing and vulcanization effects of silane Si69 in silica–filled compounds *Kaautschuk + Gummi–Kunststoffe* 34, 280–284.

Wolff, S. (1982) Optimization of silane–silica OTR compounds. Part 1: Variations of mixing temperature and time during the modification of silica with bis–(3–triethoxysilylpropyl)—tetrasulfide. *Rubber Chemistry and Technology* 55, 967–989.

Hasse A & H.D. Luginsland (2000) Processing of organo polysulfane silanes. *Tire Technology International*, Mar. 2000, pp. 52–59.

Luginsland, H. & Hürth–Kalscheuren (2000). Reactivity of the sulfur chains of the tetrasulfane silane Si69 and the disulfane silane TESPD. *KGK Kautschuk Gummi Kunststoffe* 53, 10–23.

\* cited by examiner

*Primary Examiner*—Rip A. Lee
(74) *Attorney, Agent, or Firm*—Meredith E. Palmer; Barbara Arndt

(57) ABSTRACT

Sulfur-vulcanizable elastomeric compounds and pneumatic tire components having improved tensile mechanical and dynamic viscoelastic properties are produced by compounding polymers with silica at a temperature of 165° C. to about 200° C., in the presence of a silica dispersing agent, and a very small amount (e.g., about 0.01% to about 1% by weight, based on the weight of the silica) of a bis (trialkoxysilylorgano) tetrasulfide silica coupling agent.

20 Claims, No Drawings

SILICA-REINFORCED RUBBER COMPOUNDED WITH AN ORGANOSILANE TETRASULFIDE SILICA COUPLING AGENT AT HIGH MIXING TEMPERATURE

FIELD OF THE INVENTION

The invention generally relates to vulcanizable elastomeric compounds containing silica as a reinforcing filler.

BACKGROUND OF THE INVENTION

When producing elastomeric compositions for use in rubber articles, such as tires, power belts, and the like, it is desirable that these elastomeric compositions are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties, such as the compound Mooney viscosity, modulus, tangent delta (tan δ), and the like. Rubber articles, especially tires, produced from vulcanized elastomers exhibiting these improved properties will have reduced hysteresis, better rolling resistance, snow and ice traction, wet traction, and improved fuel economy for vehicles equipped with such tires.

With the increasing use of silica as a reinforcing filler for rubber, filler dispersion in rubber stocks has become a major concern. Because polar silanol groups on the surface of silica particles tend to self-associate, reagglomeration of silica particles can occur after compounding, leading to poor silica dispersion and a high compound viscosity. The strong silica filler network results in a rigid uncured compound that is difficult to process in extrusion and forming operations. Previous attempts at preparing readily processable, vulcanizable silica-filled rubber stocks containing natural rubber or diene polymer and copolymer elastomers have focused on the use, during compounding, of bifunctional silica coupling agents having a moiety (e.g., a silyl group) reactive with the silica surface, and a moiety (e.g., a mercapto, amino, vinyl, epoxy or sulfur group) that binds to the elastomer. Well known examples of such silica coupling agents are mercaptosilanes and bis(trialkoxysilylorgano) polysulfides, such as bis(3-triethoxysilylpropyl) tetrasulfide which is sold commercially as Si69 by Degussa. Conventionally, the amount of a silica coupling agent, such as Si69, employed in the rubber compounding mixture is about 5% to about 20% by weight, based on the weight of the silica. The requirement for the large quantity of silica coupling agents, which are expensive, is one of several disadvantages of the use of these agents.

The coupling reaction of silica and Si69, as exemplary of the reactions between silica and the bis(trialkoxysilylorgano) polysulfides, can be divided into two separate reactions, i.e., the triethoxysilyl group of the Si69 reacts with the silanol groups on the silica during mixing, with the evolution of a considerable amount of ethanol, and the tetrasulfide chain reacts with the polymer under curing conditions to form rubber-to-filler bonds. A disadvantage of the use of polysulfides, having an average of about 3.8 or more sulfur groups in the polysulfide chain, is that the silica-silane reaction must be conducted at a temperature of over 140° C. to permit the reaction to take place rapidly, but below 165° C., if an irreversible thermal degradation of the polysulfane function of the coupling agent and premature curing (scorch) of the mixture are to be avoided. The upper processing temperature limitation results in a marked reduction in the mechanical activity of mixing which is essential for an optimum dispersion of the silica throughout the polymer matrix. Therefore, compared with carbon black-filled compositions, silica-silane tread compounds require a longer mixing time at a lower temperature to achieve improved performance, resulting in decreased production and increased expense.

Another disadvantage of the use of bis(trialkoxysilylorgano) tetrasulfide silica coupling agents is that the upper processing temperature limitation results in the retention, in the compounded product, of unreacted triethoxysilyl groups that are available to further react with the silica and moisture during storage, extrusion, tire build, and/or curing, resulting in an undesirable increase in the compound viscosity, and a shorter shelf life. Moreover, the continuing reaction in the compound evolves more (unevaporated) ethanol, resulting in porous zones or blisters which can form surface defects in the resulting formed rubber articles and/or can impair the dimensional stability of treads during extrusion and tire building. As a result, a low tread strip drawing speed must be maintained to ensure the drawn product conforms with specifications, resulting in a further decrease in production and concomitant increase in costs.

To address the expense and other problems related to bis(trialkoxysilylorgano) tetrasulfide and other bifunctional silica coupling agents, recent approaches to improving dispersion of silica in rubber compounds have been directed to reducing or replacing the use of such silica coupling agents by employing silica dispersing agents, such as monofunctional silica shielding agents (e.g., silica hydrophobating agents that chemically react with the surface silanol groups on the silica particles but are not reactive with the elastomer) and agents which physically shield the silanol groups, to prevent reagglomeration (flocculation) of the silica particles after compounding. For example, silica dispersing agents, such as alkyl alkoxysilanes, glycols (e.g., diethylene glycol or polyethylene glycol), fatty acid esters of hydrogenated and non-hydrogenated $C_5$ and $C_6$ sugars (e.g., sorbitan oleates, and the like), polyoxyethylene derivatives of the fatty acid esters, and fillers such as mica, talc, urea, clay, sodium sulfate, and the like, are the subjects of EP 890603 and EP 890606. Such silica dispersing agents can be used to replace all or part of expensive bifunctional silica coupling agents, while improving the processability of silica-filled rubber compounds by reducing the compound viscosity, increasing the scorch time, and reducing silica reagglomeration. To achieve a satisfactory cure of the rubber compound, the use of silica dispersing aids includes employing an increased amount of sulfur in a mixing step when curing agents are added to the composition, to replace sulfur that otherwise would have been supplied by a sulfur-containing silica coupling agent.

An advantage of the use of silica dispersing aids during compounding of elastomers with silica is that, unlike the bifunctional silica coupling agents described above, the dispersing agents do not contain sulfur and, thus, they can be used at high temperature, e.g., about 165° C. to about 200° C., in the absence of curing agents, without increasing the risk of premature curing. At these high temperatures, the reaction between the silica and alkoxysilyl groups of alkyl alkoxysilane silica dispersing agents is accelerated, resulting in an increase in the amount of alcohol evolved and evaporated during compounding, and a decrease in evolution of alcohol from the compound during storage, extrusion, curing and tire build.

SUMMARY OF THE INVENTION

Unexpectedly, it has been discovered that improvements in the tensile mechanical properties and dynamic viscoelastic properties of silica-reinforced sulfur vulcanized rubbers can be achieved by compounding polymers with silica at a temperature of 165° C. to about 200° C., in the presence of a silica dispersing aid and a very small amount of a bis (trialkoxysilylorgano) tetrasulfide silica coupling agent, such as Si69. The terms elastomer, polymer and rubber are used interchangeably herein, as is customary in the rubber industry. It has been unexpectedly discovered that compounding the elastomer with silica in the presence of the very small amount (e.g.,about 0.01% to about 1% by weight, based on the weight of the silica) of the bis (trialkoxysilylorgano) tetrasulfide silica coupling agent at the high compounding temperature, does not result in premature curing. The silica coupling agent facilitates binding of silica by the polymer, and the silica dispersing aid provides desirable processability. Exemplary silica dispersing aids include, but are not limited to, alkyl alkoxysilanes, fatty acid esters of hydrogenated or non-hydrogenated $C_5$ or $C_6$ sugars, polyoxyethylene derivatives of the fatty acid esters, and esters of polyols, and the like, and mixtures of any of the foregoing.

The resulting cured elastomeric compounds demonstrate tensile mechanical and dynamic viscoelastic properties that are improved over similar compounds prepared with a conventional amount of the bis(trialkoxysilylorgano) tetrasulfide silica coupling agent at a temperature of 160° C. or less. As used herein, a conventional amount of the silica coupling agent is about 5% to about 20% by weight, based on the weight of the silica. In particular, the sulfur-vulcanizable rubber compounds of the invention compounds exhibit about a 10% to about a 50% decrease in filler flocculation after compounding, as measured by $\Delta G'$, and/or about a 5% to about a 20% decrease in tan $\delta$ at 65° C. The invention compounds have longer scorch times, faster curing rates, and a decrease in evolution of ethanol during storage, extrusion, curing and tire build, resulting in less compound porosity with fewer blisters, and a more stable compound viscosity during storage. Rubber compounds produced according to the invention method exhibit improved dynamic viscoelastic properties, especially a lower storage modulus (G') at −20° C., a higher tan $\delta$ at 0° C., and a lower tan $\delta$ at 50° C. Such properties have been commonly used in the tire industry to predict tire performance in the categories of snow and ice traction (G' at −20° C.), wet traction (tan $\delta$ at 0° C.), and rolling resistance (tan $\delta$ at 50° C.).

The invention further provides a method of preparing the sulfur-vulcanized elastomeric compound of the invention, and a pneumatic tire having at least one component produced from the compound.

DETAILED DESCRIPTION OF THE INVENTION

The invention provides a sulfur-vulcanizable elastomeric compound, comprising an elastomer, a reinforcing filler comprising silica or a mixture thereof with carbon black, a silica dispersing agent, about 0.01% to about 1% by weight of a bis(trialkoxysilylorgano) tetrasulfide silica coupling agent, based on the weight of the silica, and a cure agent comprising an effective amount of sulfur to achieve a satisfactory cure. The bis(trialkoxysilylorgano) tetrasulfide can be present in the compound in an amount of about 0.05% to about 1% by weight, typically about 0.1% to about 1% by weight, based on the weight of the silica. The compound is formed by mixing the elastomer, the silica, the bis (trialkoxysilylorgano) tetrasulfide silica coupling agent, and the silica dispersing aid, in the absence of the cure agent, at a temperature of 165° C. to about 200° C.

At the high compounding temperature of 165° C. to about 200° C., the hydrolysis reaction (the alkoxysilane-silica reaction) between the alkoxysilyl groups of the silica coupling agent and the silica is accelerated, resulting in a desirable increase in the amount of alcohol evolved and evaporated during compounding, and a concomitant decrease in the evolution of alcohol from the compound during storage, extrusion, curing and tire build. The alkoxysilane-silica reaction requires the presence of a silane and silica. In addition to the silane of the silica coupling agent, the silane can be present as an alkoxysilane terminal functional group on the polymer, and/or as an alkoxysilane silica dispersing aid, such as an alkyl alkoxysilane described below. In one embodiment of the invention, the elastomer has an alkoxysilane terminal group, and the reaction between the silica filler and the alkoxysilane terminal group facilitates the formation of polymer-filler bonds.

The reaction that binds silica to polymers having one to three (n) alkoxysilane terminal groups is well known and is schematically illustrated below.

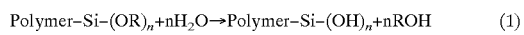

$$\text{Polymer-Si-(OR)}_n + n\text{H}_2\text{O} \rightarrow \text{Polymer-Si-(OH)}_n + n\text{ROH} \quad (1)$$

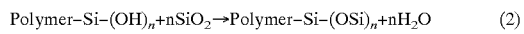

$$\text{Polymer-Si-(OH)}_n + n\text{SiO}_2 \rightarrow \text{Polymer-Si-(OSi)}_n + n\text{H}_2\text{O} \quad (2)$$

The alkoxysilane-silica reaction also occurs in the binding of silica by bis(trialkoxysilylorgano) tetrasulfide silica coupling agents, such as Si69, at a temperature of 160° C. or less, although the reaction is slower at the lower temperature. As described above, it is known that the use of a typical coupling amount of Si69 (e.g., about 10% to about 25% by weight, based on the weight of the silica) at a temperature of greater than about 160° C. results in irreversible thermal degradation of the polysulfane function of the coupling agent and premature curing of the mixture. However, according to the present invention, it has unexpectedly been discovered that very small amounts (e.g., about 0.01% to about 1% by weight, based on the weight of the silica) of bis(trialkoxysilylorgano) tetrasulfide silica coupling agents can be mixed with the elastomer and the silica, in the absence of added sulfur and cure agents, at 165° C. to about 200° C., without premature curing of the compound.

Exemplary bis(trialkoxysilylorgano) tetrasulfide silica coupling agents suitable for use in the invention include, but are not limited to, bis(3-triethoxysilylpropyl) tetrasulfide, bis(2-triethoxysilylethyl) tetrasufide, bis(3-trimethoxysilylpropyl) tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N, N-dimethylthiocarbamoyl tetrasulfide, 3-trimethoxysilylpropyl-benzothiazole tetrasulfide, 3-triethoxysilylpropylbenzothiazole tetrasulfide, and the like, and mixtures of any of the foregoing. Particularly preferred is bis(3-triethoxysilylpropyl) tetrasulfide.

Although the bis(trialkoxysilylorgano) tetrasulfides having methoxysilane groups can be used, it is preferred for environmental reasons that ethoxysilanes are employed, rather than methoxysilanes, because ethyl alcohol, rather than methyl alcohol, will be released when the alkoxysilane portion of the coupling agent reacts with the surface of the silica particle.

Exemplary silica dispersing aids include, but are not limited to, alkyl alkoxysilanes, fatty acid esters of hydrogenated or non-hydrogenated $C_5$ or $C_6$ sugars, polyoxyethylene derivatives of the fatty acid esters, and esters of polyols, and the like, or a mineral or non-mineral additional, non-reinforcing filler, described below, and mixtures of any of these. Preferably the silica dispersing aid is an alkyl alkoxysilane, alone or in combination with any of the foregoing silica dispersing aids.

Alkyl alkoxysilanes suitable for use as silica dispersing aids in the invention compounds have the formula $$R^1_p Si(OR^2)_{4-p}$$

where the alkoxy groups are the same or different from each other, each $R_1$ independently comprises $C_1$ to about $C_{20}$ aliphatic, about $C_5$ to about $C_{20}$ cycloaliphatic, or about $C_6$ to about $C_{20}$ aromatic, each $R^2$ independently comprises $C_1$ to about $C_6$, and p is an integer from 1 to 3. Preferably, the alkyl alkoxysilane is an alkyl trialkoxysilane. Preferably, at least one $R^1$ contains from 6 to 20 carbon atoms and the remainder of the $R^1$ groups, if any, contain from 1 to 3 carbon atoms. Preferably, $R^2$ contains 1 to 4, more preferably 1 or 2, carbon atoms. Preferably $R^2$ is an alkyl group. More preferably, at least one $R^1$ is much larger in terms of carbon atoms than an $R^2$ contained in the alkoxy groups of the silane.

Exemplary alkyl alkoxysilanes include, but are not limited to, octyl triethoxysilane, octyl trimethoxysilane, trimethyl ethoxysilane, cyclohexyl triethoxysilane, isobutyl triethoxysilane, ethyl trimethoxysilane, cyclohexyl tributoxysilane, dimethyl diethoxysilane, methyl triethoxysilane, propyl triethoxysilane, hexyl triethoxysilane, heptyl triethoxysilane, nonyl triethoxysilane, octadecyl triethoxysilane, methyloctyl diethoxysilane, dimethyl dimethoxysilane, methyl trimethoxysilane, propyl trimethoxysilane, hexyl trimethoxysilane, heptyl trimethoxysilane, nonyl trimethoxysilane, octadecyl trimethoxysilane, methyloctyl dimethoxysilane, and mixtures thereof Preferably, the alkyl alkoxysilane is a triethoxysilane. More preferably, the alkyl alkoxysilane is selected from at least one of n-octyl triethoxysilane, n-hexadecyl triethoxysilane, n-octadecyl triethoxysilane, and methyl n-octyl diethoxysilane.

Similarly to the silica coupling agents above, alkyl alkoxysilane silica dispersing aids employing methoxysilane groups can be used; however, it is preferred for environmental reasons that ethoxysilanes are employed, rather than methoxysilanes, because ethyl alcohol, rather than methyl alcohol, will be released when the alkoxysilane portion of the compound reacts with the surface of the silica particle.

The alkyl alkoxysilane can be present in the compound in an amount of about 0.1% to about 25% by weight, especially about 0.1% to about 15% by weight, based on the weight of the silica.

Exemplary fatty acid esters of hydrogenated and non-hydrogenated $C_5$ and $C_6$ sugars (e.g., sorbose, mannose, and arabinose) that are useful as silica dispersing aids include, but are not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80.

A useful amount of these additional silica dispersing aids when used with the bis(trialkoxysilylorgano) polysulfide silica coupling agents is about 0.1% to about 25% by weight based on the weight of the silica, with about 0.5% to about 20% by weight being preferred, and about 1% to about 15% by weight based on the weight of the silica being more preferred. Esters of polyols, including glycols such as polyhydroxy compounds and the like, in the same quantities, are also useful in all invention embodiments.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals. Generally, a useful amount of these optional silica dispersing aids is about 0.1% to about 25% by weight based on the weight of the silica, with about 0.5% to about 20% by weight being preferred, and about 1% to about 15% by weight based on the weight of the silica being more preferred.

The alkyl alkoxysilanes, the fatty acid esters and their polyoxyethylene derivatives can be fully or partially supported by the reinforcing filler. The ratio of the dispersing aid to the reinforcing filler is not critical. If the dispersing aid is a liquid, a suitable ratio of dispersing aid to filler is that which results in a suitably dry material for addition to the elastomer. For example, the ratio can be about 1/99 to about 70/30, about 20/80 about 60/40, about 50/50, and the like.

Certain additional fillers can be utilized according to the present invention as processing aids, including mineral fillers, such as clay (hydrous aluminum silicate), talc (hydrous magnesium silicate), aluminum hydrate [$Al(OH)_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support any of the silica dispersing aids, and silica coupling agents described above. As with the support of the silica dispersing aid on the reinforcing filler, as described above, the ratio of dispersing aid to non-reinforcing filler is not critical. For example, the ratio can be about 1/99 to about 70/30, about 20/80 about 60/40, about 50/50, and the like.

Elastomers suitable for use in the invention compounds are preferably diene elastomers, such as homopolymers of conjugated diene monomers, and copolymers and terpolymers of the conjugated diene monomers with monovinyl aromatic monomers and trienes. Exemplary elastomers include, but are not limited to, polyisoprene, polystyrene, polybutadiene, butadiene-isoprene copolymer, butadiene-isoprene-styrene terpolymer, isoprene-styrene copolymer, and styrene-butadiene copolymer. In one embodiment of the invention the elastomer has an alkoxysilane terminal group.

The elastomeric compositions of the invention are preferably compounded with reinforcing fillers, such as silica, or a mixture of silica and carbon black. Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 100 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165MP), and J. M. Huber Corporation.

The elastomers can be compounded with all forms of carbon black in a mixture with the silica. The carbon black can be present in amounts ranging from about one to about 50 phr, with about five to about 35 phr being preferred. The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethylammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

In one embodiment of the invention, a method for preparing a sulfur-vulcanized elastomeric compound, comprises the steps of (a) mixing together at a temperature of 165° C. to about 200° C. in the absence of added sulfur and cure agents, an elastomer optionally having an alkoxysilane terminal group, a reinforcing filler comprising silica or a mixture thereof with carbon black, about 0.01% to about 1% by weight of a bis(trialkoxysilylorgano) tetrasulfide silica coupling agent based on the weight of the silica and a silica dispersing aid; (b) allowing the mixture to cool below the mixing temperature; (c) mixing the mixture obtained in step (b), at a temperature lower than a vulcanization temperature, with a cure agent and an effective amount of sulfur to achieve a satisfactory cure; and (d) curing the mixture obtained in step (c).

In particular, the initial step in the method requires that the mixture reaches a temperature from 165° C. to about 200° C., preferably about 170° C. to about 200° C. and, more preferably, about 170° C. to about 185° C. Alternatively, the initial mixing step can include at least two substeps. That is, initial step can comprise the substeps of (i) mixing together at temperature of 165° C. to about 200° C., the elastomer, at least a portion of the silica, at least a portion of the bis(trialkoxysilylorgano) tetrasulfide silica coupling agent, and at least a portion of the silica dispersing aid; (ii) cooling the mixture the mixing temperature; and (iii) mixing the mixture obtained in step (ii) with the remainder of the silica, if any, and the remainder of the silica coupling agent and/or the remainder of the silica dispersing aid, if any, at 165° C. to about 200° C. As disclosed above, the preferred temperature range is about 170° C. to about 200° C., especially abut 170° C. to about 185° C.

The method can further include a remill step in which either no ingredients are added to the first mixture, or non-curing ingredients are added, in order to reduce the compound viscosity and improve the dispersion of the silica reinforcing filler. The temperature of the remill step is typically about 130° C. to about 175° C., especially about 145° to about 165° C.

The final step of the mixing process is the addition of cure agents to the mixture, including an effective amount of sulfur to achieve a satisfactory cure of the final compound. The temperature at which the final mixture is mixed must be below the vulcanization temperature in order to avoid unwanted precure of the compound. Therefore, the temperature of the final mixing step should not exceed about 120° C. and is typically about 40° C. to about 120° C., preferably about 60° C. to about 110° C. and, especially, about 75° C. to about 100° C.

The order of addition of the silica, the silica coupling agent and the silica dispersing aid to the elastomer in the mixer in the initial step of the method is not critical. The silica coupling agent and/or the silica dispersing aid can be added prior to or after, or at the same time as the addition of the silica to the elastomer. The silica coupling agent and/or the silica dispersing aid can be partially or fully supported on the silica and/or the carbon black reinforcing filler and/or other fillers described above. An exemplary commercial product containing Si69 supported as a 50/50 blend on carbon black is available from Degussa, as X50S. The ratio of the amount of supported silica coupling agent to the filler is not critical.

The use of a silica dispersing aid with a very small amount of the bis(trialkoxysilylorgano) tetrasulfide requires an appropriate adjustment in the amount of sulfur added in the final step of the mixing process to achieve a satisfactory cure of the compound. In particular, the amount of the bis (trialkoxysilylorgano) tetrasulfide employed in the present invention provides substantially less sulfur than required for a satisfactory cure. An effective amount of sulfur in any of the invention compositions would provide a property of the cured compound that is approximately equal to the same property of a satisfactorily cured compound containing a conventional amount of Si69 (i.e., about 10% to about 25% by weight, based on the weight of the silica). Cured properties for comparison include, but are not limited to, the value of the 300% modulus (psi), the molecular weight between crosslinks ($M_c$, g/mol), and the like, and other cured compound properties that are well known to those skilled in the art of rubber making. The increased amount of sulfur to compensate for the reduced availability of sulfur from the bis(trialkoxysilylorgano) tetrasulfide silica coupling agent will vary from composition to composition, depending on the amount of silica and the amount of silica coupling agent present in the formulation. Based on the disclosure contained herein, and in the examples of invention compositions described below, one skilled in the art of rubber compounding can easily determine the effective amount of sulfur required for a satisfactory cure of the compound without undue experimentation. The additional sulfur can take any form, including soluble sulfur, insoluble sulfur, or any of the sulfur-donating compounds described as vulcanizing agents below, or mixtures of the foregoing.

The compounds produced by the method of the invention preferably exhibit about a 10% to about a 50% decrease in filler flocculation after compounding, as measured by $\Delta G'$, compared to a similar compound in which a conventional amount of the bis(trialkoxysilylorgano) tetrasulfide silica coupling agent is mixed with the silica, in the absence of the cure agent, at a temperature of 160° C. or less.

The present invention can be used in conjunction with any solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. Thus, the elastomeric products can include diene homopolymers from monomer A and copolymers thereof with monovinyl aromatic monomers B. Exemplary diene homopolymers are those prepared from diolefin monomers having from about four to about 12 carbon atoms. Exemplary vinyl aromatic copolymers are those prepared from monomers having from about eight to about 20 carbon atoms. Copolymers can comprise from about 99 percent to about 50 percent by weight of diene units and from about one to about 50 percent by weight of monovinyl aromatic or triene units, totaling 100 percent. The polymers, copolymers and terpolymers of the present invention can have 1,2-microstructure contents ranging from about 10 percent to about 80 percent, with the preferred polymers, copolymers or terpolymers having 1,2-microstructure content of from about 25 to 65 percent, based upon the diene content. The elastomeric copolymers are preferably random copolymers which result from simultaneous copolymerization of the monomers A and B with randomizing agents, as is known in the art.

Preferred polymers for use in a vulcanized elastomeric compound of the invention include polyisoprene, polystyrene, polybutadiene, butadiene-isoprene copolymer, butadiene-isoprene-styrene terpolymer, isoprene-styrene copolymer, and styrene-butadiene copolymer.

Anionic polymerization initiators for use in polymerizing the anionically polymerizable monomers include, but are not limited to, organo-sodium, organo-potassium, organo-tin-lithium, organo-lithium, dialkylimido-lithium and cycloalkylimido-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms, and preferably from about 2 to about δ carbon atoms. Although the hydrocarbyl group is preferably an aliphatic group, the hydrocarbyl group can also be cycloaliphatic or aromatic. The aliphatic group can be a primary, secondary, or tertiary group, although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes include, but are not limited to, n-butyl lithium, n-propyl lithium, iso-butyl lithium, tert-butyl lithium, tributyl tin lithium (described in co-owned U.S. Pat. No. 5,268,439), amyl-lithium, cyclohexyl lithium, and the like. Other suitable organo-lithium compounds for use as anionic initiators are well known to those skilled in the art. A mixture of different lithium initiator compounds also can be employed. The preferred organo-lithium initiators are n-butyl lithium, tributyl tin lithium and "in situ" produced lithium hexamethyleneiride initiator prepared by reacting hexamethyleneimine and n-butyl lithium (described in co-owned U.S. Pat. No. 5,496,940).

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles (mM) of lithium per 100 grams of monomers up to about 100 mM of lithium per 100 grams of monomers, depending upon the desired polymer molecular weight.

Polymerization is usually conducted in a conventional solvent for anionic polymerizations, such as hexane, cyclohexane, benzene and the like. Various techniques for polymerization, such as semi-batch and continuous polymerization can be employed.

In order to promote randomization in co-polymerization and to increase vinyl content, a polar coordinator can optionally be added to the polymerization ingredients. Amounts range between about one to about 90 or more equivalents per equivalent of lithium. The amount depends upon the type of polar coordinator that is employed, the amount of vinyl desired, the level of styrene employed and the temperature of the polymerizations, as well as the selected initiator. Compounds useful as polar coordinators are organic and include tetrahydrofuran, linear and cyclic oligomeric oxolanyl alkanes such as 2-2'-di(tetrahydrofuryl) propane, dipiperidyl ethane, hexamethyl phosphoramide, N-N'-dimethyl piperazine, diazabicyclo octane, dimethyl ether, diethyl ether, tributyl amine and the like. The linear and cyclic oligomeric oxolanyl alkane polar coordinators are described in U.S. Pat. No. 4,429,091, the subject matter of which regarding polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TMEDA).

Polymerization is begun by charging a blend of the monomer(s) and solvent to a suitable reaction vessel, followed by the addition of the polar coordinator and the initiator previously described. The procedure is carried out under anhydrous, anaerobic conditions. Often, it is conducted under a dry, inert gas atmosphere. The polymerization can be carried out at any convenient temperature, such as about 0° C. to about 150° C. For batch polymerizations, it is preferred to maintain the peak temperature at from about 50° C. to about 150° C. and, more preferably, from about 60° C. to about 100° C. Polymerization is allowed to continue under agitation for about 0.15 hours to 24 hours. After polymerization is complete, the product is terminated by a quenching agent, an endcapping agent and/or a coupling agent, as described herein below. The terminating agent is added to the reaction vessel, and the vessel is agitated for about 0.1 hours to about 4.0 hours. Quenching is usually conducted by stirring the polymer and quenching agent for about 0.01 hours to about 1.0 hour at temperatures of from about 20° C. to about 120° C. to ensure a complete reaction. Polymers terrninated with an alkoxysilane functional group, as discussed herein below, are subsequently treated with alcohol or other quenching agent.

Lastly, the solvent is removed from the polymer by conventional techniques such as drum drying, extruder drying, vacuum drying or the like, which can be combined with coagulation with water, alcohol or steam. If coagulation with water or steam is used, oven drying can be desirable.

One way to terminate the polymerization reaction is to employ a protic quenching agent to give a monofunctional polymer chain. Quenching can be conducted in water, steam or an alcohol such as isopropanol, or any other suitable method. Quenching can also be conducted with a functional terminating agent, resulting in a difunctional polymer. Any compounds providing terminal functionality (i.e., endcapping) that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidinones, tin tetrachloride, tributyl tin chloride, carbon dioxide, and mixtures thereof Further examples of reactive compounds include the terminators described in co-owned U.S. Pat. Nos. 5,521,309 and 5,066,729, the subject matter of which, pertaining to terminating agents and termainating reactions, is hereby incorporated by reference. Other useful terminating agents can include those of the structural formula $(R)_a ZX_b$, where Z is tin or silicon. It is preferred that Z is tin. R is an alkyl having from about 1 to about 20 carbon atoms; a cycloalkyl having from about 3 to about 20 carbon atoms; an aryl having from about 6 to about 20 carbon atoms, or an aralkyl having from about 7 to about 20 carbon atoms. For example, R can include methyl, ethyl, n-butyl, neophyl, phenyl, cyclohexyl or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichioride, butyl silicon trichloride, as well as tetraethoxysilane, $Si(OEt)_4$, and methyl triphenoxysilane, $MeSi(OPh)_3$. The practice of the present invention is not limited solely to these terminators, since other compounds that are reactive with the polymer bound carbon-lithium moiety can be selected to provide a desired functional group.

While terminating to provide a functional group on the terminal end of the polymer is preferred, it is further preferred to terminate by a coupling reaction with, for example, tin tetrachloride or other coupling agent such as silicon tetrachloride or esters. High levels of tin coupling are desirable in order to maintain good processability in the subsequent manufacturing of rubber products. It is preferred that the polymers for use in the vulcanizable elastomeric compositions according to the present invention have at least about 25 percent tin coupling. That is, about 25 percent of the polymer mass after coupling is of higher molecular weight than the polymer before coupling as measured, for example, by gel permeation chromatography. Preferably, before coupling, the polydispersity (the ratio of the weight average molecular weight to the number average molecular weight) of polymers, which can be controlled over a wide range, is from about one to about 5, preferably one to about 2 and, more preferably, one to about 1.5.

As noted above, various techniques known in the art for carrying out polymeizations can be used to produce elastomers polymers suitable for use in the vulcanizable elastomeric compositions, without departing from the scope of the present invention.

The preferred conjugated diene polymers, or copolymers or terpolymers of conjugated diene monomers and monovinyl aromatic monomers, can be utilized as 100 parts of the rubber in the treadstock compound, or they can be blended with any conventionally employed treadstock rubber which includes natural rubber, synthetic rubber and blends thereof Such rubbers are well known to those skilled in the art and include synthetic polyisoprene rubber, styrene-butadiene rubber (SBR), styrene-isoprene-butadiene rubber, styrene-isoprene rubber, butadiene-isoprene rubber, polybutadiene, butyl rubber, neoprene, ethylene-propylene rubber, ethylene-propylene-diene rubber (EPDM), acrylonitrile-butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene-propylene rubber and the like. When the vulcanizable elastomeric composition of the present invention is blended with conventional rubbers, the amounts can vary widely with a lower limit comprising about ten percent to 20 percent by weight of the total rubber. The minimum amount will depend primarily upon the physical properties desired.

Vulcanized elastomeric compounds of the invention are prepared by the method described above. It is readily understood by those having skill in the art that the rubber compound would be compounded by methods generally known in the rubber compounding art, such as mixing the various vulcanizable polymer(s) with various commonly used additive materials such as, for example, curing agents, activators, retarders and accelerators, processing additives, such as oils, resins, including tackifying resins, plasticizers, pigments, additional fillers, fatty acid, zinc oxide, waxes, antioxidants, anti-ozonants, and peptizing agents. As known to those skilled in the art, depending on the intended use of the sulfur vulcanizable and sulfur vulcanized material (rubbers), the additives mentioned above are selected and commonly used in conventional amounts., in addition to other conventional rubber additives including, for example, other fillers, plasticizers, antioxidants, cure agents and the like, using standard rubber mixing equipment and procedures.

Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

Typical amounts of tackifier resins, if used, comprise about 0.5 to about 10 phr, usually about one to about 5 phr. Typical amounts of compounding aids comprise about one to about 50 phr. Such compounding aids can include, for example, aromatic, naphthenic, and/or paraffinic processing oils. Typical amounts of antioxidants comprise about 0.1 to about 5 phr. Suitable antioxidants, such as diphenyl-p-phenylenediamine, are known to those skilled in the art. Typical amounts of anti-ozonants comprise about 0.1 to about 5 phr.

Typical amounts of fatty acids, if used, which can include stearic acid, palmitic acid, linoleic acid or a mixture of one or more fatty acids, can comprise about 0.5 to about 3 phr. Typical amounts of zinc oxide comprise about one to about 5 phr. Typical amounts of waxes comprise about one to about 2 phr. Often microcrystalline waxes are used. Typical amounts of peptizers, if used, comprise about 0.1 to about 1 phr. Typical peptizers can be, for example, pentachlorothiophenol and dibenzamidodiphenyl disulfide.

The reinforced rubber compounds can be cured in a conventional manner with known vulcanizing agents at about 0.1 to 10 phr. For a general disclosure of suitable vulcanizing agents, one can refer to Kirk-Othmer, *Encyclopedia of Chemical Technology*, 3rd ed., Wiley Interscience, N.Y. 1982, Vol. 20, pp. 365 to 468, particularly "Vulcanization Agents and Auxiliary Materials," pp. 390 to 402. Vulcanizing agents can be used alone or in combination.

The vulcanization is conducted in the presence of a sulfur vulcanizing agent. Examples of suitable sulfur vulcanizing agents include "rubbermaker's" soluble sulfur; sulfur donating vulcanizing agents, such as an amine disulfide, polymeric polysulfide or sulfur olefin adducts; and insoluble polymeric sulfur. Preferably, the sulfur vulcanizing agent is soluble sulfur or a mixture of soluble and insoluble polymeric sulfur. The sulfur vulcanizing agents are used in an amount ranging from about 0.1 to about 10 phr, more preferably about 1.5 to about 7.5 phr, with a range of about 1.5 to about 5 phr being most preferred.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenylguanidine (DPG) and the like. The amount of the vulcanization accelerator used is about 0.1 to about 5 phr, preferably about 0.2 to about 3 phr.

Pneumatic tires having an improved tensile mechanical and dynamic viscoelastic properties, and comprising at least one component produced from the sulfur-vulcanized elastomeric compound of the invention, according to the method of the invention described above, preferably exhibit reduced hysteresis as measured by about a 5% to about a 20% decrease in tan δ at 65° C., compared to a tire component produced from a similar compound in which a conventional amount of the bis(trialkoxysilylorgano) tetrasulfide silica coupling agent is mixed with the silica, in the absence of the cure agent, at a temperature of 160° C. or less.

EXAMPLES

The following examples illustrate the methods for preparation of the sulfur-vulcanizable elastomeric compositions of the present invention. However, the examples are not intended to be limiting, as other methods for preparing these compositions and different compounding formulations can be determined by those skilled in the art without departing from the scope of the invention herein disclosed and claimed.

Example 1

In order to demonstrate the methods of preparation and properties of the vulcanizable elastomeric compositions of the invention, four stocks of rubbers were prepared according to the respective compounding formulations and mixing conditions shown in Tables 1 through 5. Stocks 1 and 2 were solution styrene-butadiene rubber (SBR) mixed in a laboratory scale Brabender mixer. Stocks 3 and 4 were solution SBR terminated with a tetraethoxysilane (TEOS) functionalizing agent to produce a TEOS-terminated polymer. These stocks were made at a tire plant using a Banbury mixer. Stocks 2 and 4 are invention stocks, and stocks 1 and 3 are the respective comparison stocks. As illustrated in Table 5, invention stock 2, "Si69/MA", is a compound in which a very small amount (0.3 phr, which is 1% by weight based on the weight of the silica) of the tetrasulfide coupling agent, Si69, was mixed with n-octyl triethoxysilane (OTES), and the silica shielding agent sorbitan monooleate (SMO), in the master batch stage to a drop temperature of 175° C. to 180° C. As a comparison, stock 1, "Si69/remill" is a compound in which the Si69 was added in the remill stage to a drop temperature of 155° C. because of the instability of Si69 at temperatures above 160° C. Invention stock 4, "Si69/MA+ Si69/remill" is a compound in which some Si69 was added in the master batch stage, with SMO, to a drop temperature of 175° C. to 180° C., and an additional amount of Si69 was added in the remill stage to a drop temperature of 145° C. Comparison stock 3, "Si69/remill" is a stock in which Si69 was added only in the remill stage, to a drop temperature of 145° C. The amount of Si69 in stocks 3 and 4 was adjusted to provide equivalent molar content of ethoxysilanes. The total sulfur content of stocks 2, 3 and 4 was adjusted to compensate for the reduction in the amount of sulfur in comparison with that donated from Si69 in stock 1. The final stocks were sheeted and subsequently annealed at 171° C. for 15 minutes.

TABLE 1

Formulations of Stocks 1 and 2

| Ingredient | Amount (phr) |
| --- | --- |
| Solution SBR | 75 |
| Natural Rubber | 25 |
| Carbon Black (SAF) | 32 |
| Precipitated Silica | 30 |
| Silica Coupling Agent* | varied |
| Alkyl alkoxysilane** | varied |
| Silica shielding agent*** | varied |
| Naphthenic Process Oil | 15 |
| Wax | 1.5 |
| Antioxidant, N-(1,3 dimethylbutyl)-N'-phenyl-p-phenylene-diamine) | 0.95 |
| Sulfur | varied |
| Accelerator, N-cyclohexyl-2-benzothiazylsulfenamide (CBS) | 1.50 |
| Zinc Oxide | 2.5 |
| Diphenyl Guanidine | 0.5 |

*Si69 liquid from Degussa
**n-octyl triethoxysilane
***sorbitan monooleate

TABLE 2

Formulations of Stocks 3 and 4

| Ingredient | Amount (phr) |
| --- | --- |
| Solution SBR, TEOS-terminated | 100 |
| Carbon Black (SAF) | 32 |
| Precipitated Silica | 30 |
| Silica Coupling Agent* | varied |
| Silica Shielding Agent** | varied |
| Naphthenic Process Oil | 15 |
| Wax | 1.5 |
| Antioxidant, N-(1,3 dimethylbutyl)-N'-phenyl-p-phenylene-diamine) | 0.95 |
| Sulfur | varied |
| Accelerator, N-Cyclohexyl-2-benzothiazylsulfenamide (CBS) | 1.5 |
| Zinc Oxide | 2.5 |
| Diphenyl Guanidine | 0.5 |

*Si69 liquid from Degussa
**Sorbitan monooleate

TABLE 3

Mixing Conditions for Preparing Stocks 1 and 2

| Mixer | 310 g Brabender |
| --- | --- |

Master Batch Stage

| | |
| --- | --- |
| Initial Temperature | 100° C. |
| 0 seconds | charging polymers |
| 30 seconds | charging carbon black, silica, Si69 (if added), OTES (if added), SMO (if added), and all pigments |
| 5 minutes | drop |
| Drop Temperature | 175° C.–180° C. |

Remill Stage

| | |
| --- | --- |
| Initial Temperature | 70° C. |
| 0 seconds | charging master batch stock |
| 30 seconds | charging Si69 (if added) |
| Drop Temperature | 155° C. |

Final Stage

| | |
| --- | --- |
| Initial Temperature | 90° C. |
| 0 seconds | charging remilled stock |
| 30 seconds | charging curing agent and accelerators |
| Drop Temperature | 105° C. |

TABLE 4

Mixing Conditions for Preparing Stocks 3 and 4

| Mixer | 1100 lb. Banbury |
| --- | --- |

Master Batch Stage

| | |
| --- | --- |
| Initial Temperature | 100° C. |
| 0 seconds | charging polymers |
| 30 seconds | charging carbon black, silica, Si69 (if added), SMO (if added), and all pigments |
| 2.5 minutes | drop |
| Drop Temperature | 175° C.–180° C. |

Remill Stage

| | |
| --- | --- |
| Initial Temperature | 70° C. |
| 0 seconds | charging master batch stock |
| 30 seconds | charging Si69 (if added) |
| Drop Temperature | 145° C. |

Final Stage

| | |
| --- | --- |
| Initial Temperature | 90° C. |
| 0 seconds | charging remilled stock |
| 30 seconds | charging curing agent and accelerators |
| Drop Temperature | 105° C. |

TABLE 5

Stocks with various silanes, shielding agents and polymers and their drop temperatures

| StockNumber and Type | Polymer used | Si69 in remill (phr) | Si69 in master batch (phr) | OTES in master batch (phr) | SMO in master batch (phr) | Sulfur (phr) | Drop temperature (° C.) |
| --- | --- | --- | --- | --- | --- | --- | --- |
| 1. Si69/remill | SBR | 3 | 0 | 0 | 0 | 1.70 | 155 |
| 2. Si69/MA* | SBR | 0 | 0.3 | 1.3 | 2.8 | 2.50 | 175–180 |
| 3. Si69/remill | TEOS | 1 | 0 | 0 | 0 | 2.25 | 145 |
| 4. Si69/MA + Si69/remill | TEOS | 0.7 | 0.3 | 0 | 3.5 | 2.25 | 175–180 then 145 |

*MA = master batch stage

Example 2

The green stock (i.e., the stock obtained after the final stage, prior to curing) was characterized as to Mooney viscosity and cure characteristics, and the data are illustrated in Table 6. The Mooney viscosity measurement was conducted at 130° C. using a large rotor, and was recorded as the torque when rotor had rotated for 4 minutes. The stocks were preheated at 130° C. for 1 minute before the rotor was started. The $t_5$ is the time required for the viscosity to increase by five Mooney units during a Mooney scorch measurement. It is used as an index to predict how fast the compound viscosity will increase during processing (e.g., during extrusion). A Monsanto Rheometer MD2000 was used to characterize the stock curing process, at a frequency of 100 cycles per minute, and a strain of 7% at 171° C. The measurements $t_{S2}$ and $t_{90}$ are the times taken for an increase in torque of 2% and 90%, respectively, of the total torque increase during the cure characterization test. These values are useful in predicting the speed of the viscosity increase ($t_{S2}$) and the cure rate during the cure process ($t_{90}$).

The data illustrated in Table 6 show that the compound Mooney viscosity of the invention stock 2 (Si69/master batch) is comparable to the compound Mooney viscosity of the comparison stock 1 (Si69/remill). However, the compound Mooney viscosity of stock 4, in which the total amount of Si69 was divided between the master batch and the remill stages, is 8 units (about 10%) lower than its comparison stock 3 in which all the Si69 was added in the remill. A reduced compound Mooney viscosity is advantageous because it provides better processability and handling, especially during the extrusion process. The $t_5$ scorch time of invention stocks 2 and 4 are longer than their corresponding comparison stocks, giving the invention stocks the advantage of a larger processing time window, especially during extrusion, and a longer time to flow and fill the mold. The faster curing rates, $t_{90}$, of the invention stocks 1 and 2, compared to the comparison stocks 1 and 3, respectively, is another advantage.

The Payne effect of invention stocks 2 and 4 are both lower than their comparison stocks 1 and 3, respectively, by about 19% and about 38%, respectively. Therefore, the micro-dispersion of the silica filler is improved in each of the cured invention stocks. Invention stock 2 has a lower G' @ −20° C., and a lower tan δ @ 50° C., indicating improved snow and ice traction (G' at −20° C.), and rolling resistance (tan δ at 50° C.) in tire treads made from these stocks, compared to the Si69 in the remill stock 1. Invention stock 4 has a lower G' @ −20° C., a higher tan δ @ 0° C. and a lower tan δ @ 50° C., compared to stock 3, indicating improved snow and ice traction, wet traction and rolling resistance in tire treads made from these stocks.

TABLE 6

The Green Stock Mooney and Cure Characteristics

| Stock Number and Type | Mooney @ 130° C. | $t_5$ Scorch @ 130° C. (min) | $t_{S2}$ @ 171° C. (min) | $t_{90}$ @ 171° C. (min) |
|---|---|---|---|---|
| 1. Si69/remill | 41.5 | 16.68 | 1.82 | 4.24 |
| 2. Si69/MA* | 43.8 | 20.12 | 1.88 | 3.51 |
| 3. Si69/remill | 88.3 | 13.10 | 1.87 | 10.14 |
| 4. Si69/MA + Si69/remill | 80.0 | 15.18 | 2.36 | 6.67 |

Example 3

The degree of stabilization of the filler morphology during storage and curing of the compounds was measured by the degree of filler flocculation after compounding (the Payne effect. The Payne effect measurement (ΔG') and the tan δ at 7% strain were obtained from strain sweep tests of the four cured stocks, conducted at 65° C. at a frequency of 3.14 radians/second, and a strain sweeping from 0.25% to 14.75%. The dynamic viscoelastic properties of the cured stocks was measured by temperature sweep tests. The measured viscoelastic properties were the storage modulus (G' @ −20° C.), tan δ @ 0° C. and tan δ at 50° C. Temperature sweep tests were conducted at a frequency of 31.4 radians/second using 0.5% strain for the temperatures ranging from −100° C. to −10° C. and 2% strain for the temperatures ranging from −10° C. to +100° C. The results are listed in Table 7.

TABLE 7

The Viscoelastic Properties measured by Temperature Sweep and Strain Sweep

| Stock Number and Type | Δ G' @ 65° C. (G'@ 0.25%– G'@ 14.75%) (MPa) (S.S.) | tan δ @ 7% strain @ 65° C. (S.S.) | G' @ −20° C. (MPa) (T.S.) | tan δ @ 0° C. (T.S.) | tan δ @ 50° C. (T.S.) |
|---|---|---|---|---|---|
| 1. Si69/remill | 1.20 | 0.1081 | 21.4 | 0.1848 | 0.1148 |
| 2. Si69/MA* | 0.97 | 0.0921 | 17.47 | 0.1706 | 0.1093 |
| 3. Si69/remill | 1.90 | 0.1169 | 27.97 | 0.2633 | 0.1477 |
| 4. Si69/MA + Si69/remill | 1.18 | 0.1011 | 23.32 | 0.2700 | 0.1463 |

T.S. = Temperature Sweep data
S.S. = Strain Sweep data

Example 4

The tensile properties for the four cured stocks were measured using the standard procedure described in ASTM-D 412 at 25° C. The tensile test specimens were round rings with a diameter of 0.05 inches and a thickness of 0.075 inches. A gauge length of 1.0 inches was used for the tensile test. As illustrated by the results of the tensile tests in Table 8, the invention stocks 2 and 4 showed better mechanical strength (Tb and toughness) and a longer elongation at break (Eb) than the Si69/remill comparison stocks 1 and 3, respectively. However, the tensile modulus at 50% strain of invention stocks 2 and 4, and the tensile modulus at 300% strain of invention stock 2 are lower than their respective comparison stocks. The lower moduli could be the result of the higher content of processing oils (SMO) in stocks 2 and 4. It is expected that a decrease in the processing oil content will increase the moduli to comparative levels to those of the comparison stocks. The amount of such a decrease would be within the skill of one of ordinary skill in the art, without undue experimentation. Invention stock 4 shows much better mechanical properties than the comparison stock 3. The Lambourn wear index shows better wear resistance for invention stock 4, compared with stock 3.

TABLE 8

Tensile Mechanical Properties at 25° C.

| Stock Number and Type | M 50 (psi) | M300 (psi) | Strength, Tb (psi) | Elongation at Break, Eb (%) | Toughness (psi) | Lambourn Wear Index |
|---|---|---|---|---|---|---|
| 1. Si69/remill | 208 | 2110 | 2576 | 343 | 3647 | ND* |
| 2. Si69/MA* | 160 | 1719 | 2826 | 423 | 4812 | ND* |
| 3. Si69/remill | 266 | NA** | 1752 | 252 | 1956 | 100 |
| 4. Si69/MA + Si69/remill | 237 | 2082 | 2319 | 325 | 3174 | 106 |

*ND = not done
**NA = not available

In summary, these examples illustrate that rubber stocks compounded with a small amount of the tetrasulfide silica coupling agent, Si69, at high temperature in the master batch stage of mixing, show improved tensile mechanical and dynamic viscoelastic properties, compared with rubber stocks compounded with Si69 in the remill stage at a temperature lower than 160° C.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A sulfur-vulcanized elastomeric compound produced by a process comprising the steps of:
   (a) mixing together at a temperature of 165° C. to about 200° C. in the absence of cure agents, an elastomer optionally having an alkoxysilane terminal group, a reinforcing filler comprising silica or a mixture thereof with carbon black, about 0.01% to about 1% by weight, based on the weight of the silica, of a bis(trikoxysilylorgano) tetrasulfide silica coupling agent, and a silica dispersing aid;
   (b) allowing the mixture to cool below the mixing temperature;
   (c) mixing the mixture obtained in step (b), at a temperature lower than a vulcanization temperature, with a cure agent comprising an effective amount of sulfur to achieve a satisfactory cure; and
   (d) curing the mixture obtained in step (c).

2. The compound of claim 1, wherein the bis(trialkoxysilylorgano) tetrasulfide silica coupling agent is bis(3-triethoxysilylpropyl) tetrasulfide.

3. The compound of claim 1, wherein the bis(trialkoxysilylorgano) tetrasulfide silica coupling agent is present in an amount of about 0.05% to about 1% by weight, based on the weight of the silica.

4. The compound of claim 3, wherein the bis(trialkoxysilylorgano) tetrasulfide silica coupling agent is present in an amount of about 0.1% to about 1% by weight, based on the weight of the silica.

5. The compound of claim 1, wherein the silica dispersing aid is selected from the group consisting of an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, an ester of a polyol, and mixtures thereof.

6. The compound of claim 5, wherein the alkyl alkoxysilane has the formula

$$R^1_p Si(OR^2)_{4-p}$$

wherein the alkoxy groups are the same or different from each other, each $R^1$ independently comprises $C_1$ to about $C_{20}$ aliphatic, about $C_5$ to about $C_{20}$ cycloaliphatic, or $C_6$ to about $C_{20}$ aromatic, each $R^2$ independently comprises $C_1$ to about $C_6$, aliphotic and p is an integer from 1 to 3.

7. The compound of claim 5, wherein the alkyl alkoxysilane is a triethoxysilane.

8. The compound of claim 5, wherein the alkyl alkoxysilane is present in an amount of about 0.1% to about 25% by weight, based on the weight of the silica.

9. The compound of claim 8, wherein the alkyl alkoxysilane is present in an amount of about 0.1% to about 15% by weight, based on the weight of the silica.

10. The compound of claim 5, wherein the fatty acid ester of a hydrogenated or non-hydrogenated $C_5$ or $C_6$ sugar is selected from the group consisting of sorbitan monooleate, sorbitan dioleate, sorbitan trioleate, sorbitan sesquioleate, sorbitan laurate, sorbitan palmitate, sorbitan stearate, and mixtures thereof.

11. The compound of claim 5, wherein the fatty acid ester of a hydrogenated or non-hydrogenated $C_5$ or $C_6$ sugar is present in an amount of about 0.1% to about 25% by weight, based on the weight of the silica.

12. The compound of claim 5, wherein the polyoxyethylene derivative of the fatty acid ester of a hydrogenated or non-hydrogenated $C_5$ or $C_6$ sugar is present in an amount of about 0.1% to about 25% by weight, based on the weight of the silica.

13. The compound of claim 1, wherein the diene elastomer is selected from the group consisting of homopolymers of conjugated diene monomers, and copolymers and terpolymers of the conjugated diene monomers with monovinyl aromatic monomers and trienes.

14. The compound of claim 1, wherein the diene elastomer is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

15. A pneumatic tire comprising a component produced from a sulfur-vulcanized elastomeric compound, wherein the compound comprises an elastomer optionally having an alkoxysilane terminal group, a reinforcing filler comprising silica or a mixture thereof with carbon black, about 0.01% to about 1% by weight of a bis(trialkoxysilylorgano) tetrasulfide silica coupling agent based on the weight of the silica, a silica dispersing aid, and a cure agent comprising an effective amount of sulfur to achieve a satisfactory cure, wherein the compound is formed by mixing together the elastomer, the silica, the silica coupling agent and the silica dispersing aid, in the absence of the cure agent, at a temperature of 165° C. to about 200° C., wherein the compound exhibits about a 10% to about a 50% decrease in filler flocculation after compounding, as measured by ΔG', or reduced hysteresis as measured by about a 5% to about a 20% decrease in tangent δ at 65° C., compared to a similar compound in which a conventional amount of the bis(trialkoxysilylorgano) tetrasulfide silica coupling agent is mixed with the silica, in the absence of the cure agent, at a temperature of 160° C. or less.

16. The tire of claim 15, wherein the elastomer is selected from the group consisting of homopolymers of conjugated diene monomers, and copolymers and terpolymers of the conjugated diene monomers with monovinyl aromatic monomers and trienes.

17. The tire of claim 15, wherein the elastomer is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

18. A method for preparing a sulfur-vulcanized elastomeric compound, comprising the steps of:

(a) mixing together at a temperature of 165° C. to about 200° C. in the absence of added sulfur and cure agents, an elastomer optionally having an alkoxysilane terminal group, a reinforcing filler comprising silica or a mixture thereof with carbon black, about 0.01% to about 1% by weight of a bis(trialkoxysilylorgano) tetrasulfide silica coupling agent, based on the weight of the silica, and a silica dispersing aid;

(b) allowing the mixture to cool below the mixing temperature;

(c) mixing the mixture obtained in step (b), at a temperature lower than a vulcanization temperature, with a cure agent and an effective amount of sulfur to achieve a satisfactory cure; and (d) curing the mixture obtained in step (c).

19. The method of claim 18, wherein the mixing temperature in step (a) is about 170° C. to about 200° C.

20. The method of claim 18, wherein the mixing temperature in step (a) is about 170° C. to about 185° C.

* * * * *